United States Patent [19]

Kovalick et al.

[11] Patent Number: 5,084,681
[45] Date of Patent: Jan. 28, 1992

[54] DIGITAL SYNTHESIZER WITH PHASE MEMORY

[75] Inventors: Albert W. Kovalick, Santa Clara; Roland Hassun, San Carlos, both of Calif.

[73] Assignee: Hewlett-Packard Company, Palo Alto, Calif.

[21] Appl. No.: 562,862

[22] Filed: Aug. 3, 1990

[51] Int. Cl.$^5$ .............................................. H03B 19/00
[52] U.S. Cl. ..................................... 328/14; 307/262; 307/511; 328/151
[58] Field of Search .................. 307/262, 511; 328/14, 328/133, 151; 375/112, 114

[56] References Cited

U.S. PATENT DOCUMENTS

| | | | |
|---|---|---|---|
| 3,792,360 | 8/1972 | Carlow | 328/14 |
| 3,928,813 | 12/1975 | Kingsford-Smith | 331/1 A |
| 4,157,500 | 6/1979 | Nicoli | 328/133 |
| 4,573,017 | 2/1986 | Levine | 328/133 |
| 4,737,724 | 4/1988 | Porrot | 328/133 |
| 4,792,914 | 12/1988 | Dartois et al. | 328/14 |
| 4,812,771 | 3/1989 | Lauper et al. | 328/133 |
| 4,835,481 | 5/1989 | Geissler et al. | 328/133 |
| 4,866,394 | 9/1989 | Okano et al. | 328/155 |
| 4,868,428 | 9/1989 | Cooper | 328/155 |
| 4,878,027 | 10/1989 | Carp et al. | 328/14 |
| 4,975,660 | 12/1990 | Svenson | 328/133 |
| 5,019,785 | 5/1991 | Fognini et al. | 328/14 |
| 5,028,887 | 7/1991 | Gilmore | 328/14 |
| 5,051,702 | 9/1991 | Iwasaki | 307/262 |

*Primary Examiner*—Stanley D. Miller
*Assistant Examiner*—Terry D. Cunningham
*Attorney, Agent, or Firm*—Edward Y. Wong

[57] ABSTRACT

In direct digital synthesizers in the prior art, the output signal maintains a phase continuity whenever it switches, or hops, frequency. This phase continuity shows up as a smooth change in phase from one frequency to the next; the phase of the last frequency transitions into the phase of the new frequency without any discernable disruption. Thus, whenever the output signal returns to a switched frequency that it previously has, the output signal at the newly returned switched frequency has a new phase relative to its previous one at that frequency. For some applications, like simulating continuous different frequency sources, this phase continuity is not desirable. To overcome this disadvantage, the preferred embodiment of the present invention provides phase memory to a direct digital synthesizer so that regardless of the frequency that the output signal switches to, the output signal at that frequency is able to maintain a constant phase relative to a reference system clock pulse. In other words, switching and returning the synthesizer output signal to a selected frequency does not change the phase of the output signal at that frequency; the output signal at each frequency has the same constant phase as it has previously at that frequency. As a result, the synthesizer in accordance with the present invention appears to have a source of numerous continuous oscillators to which it can switch for a number of different frequencies, each having a constant phase.

13 Claims, 9 Drawing Sheets

DIGITAL SYNTHESIZER WITH PHASE MEMORY

BACKGROUND OF THE INVENTION

In the art of synthesizing signals, three distinguishable techniques have been used: direct analog synthesis, indirect analog synthesis, and direct digital synthesis.

In the direct analog synthesis technique, the desired signal is produced by combining and mixing various combinations of signals derived from multiplying and dividing a reference frequency signal. In synthesizing a signal having a wide frequency range, this direct technique becomes extremely complex and costly because of the many components required for the multiplying-dividing and mixing-combining processes. Hence this technique is not widely used for synthesizing signals in either the high frequency or wide frequency ranges.

In indirect analog synthesis, phase lock loops with programmable frequency dividers are commonly used to synthesize a signal with the desired frequencies. This technique is by far the most widely used at present in both commercial products and dedicated applications. The method owes its popularity in large part to the advent of inexpensive programmable frequency dividers in integrated circuit form. The result has been a substantial reduction in complexity, especially in comparison with direct analog synthesis.

Figure 1:
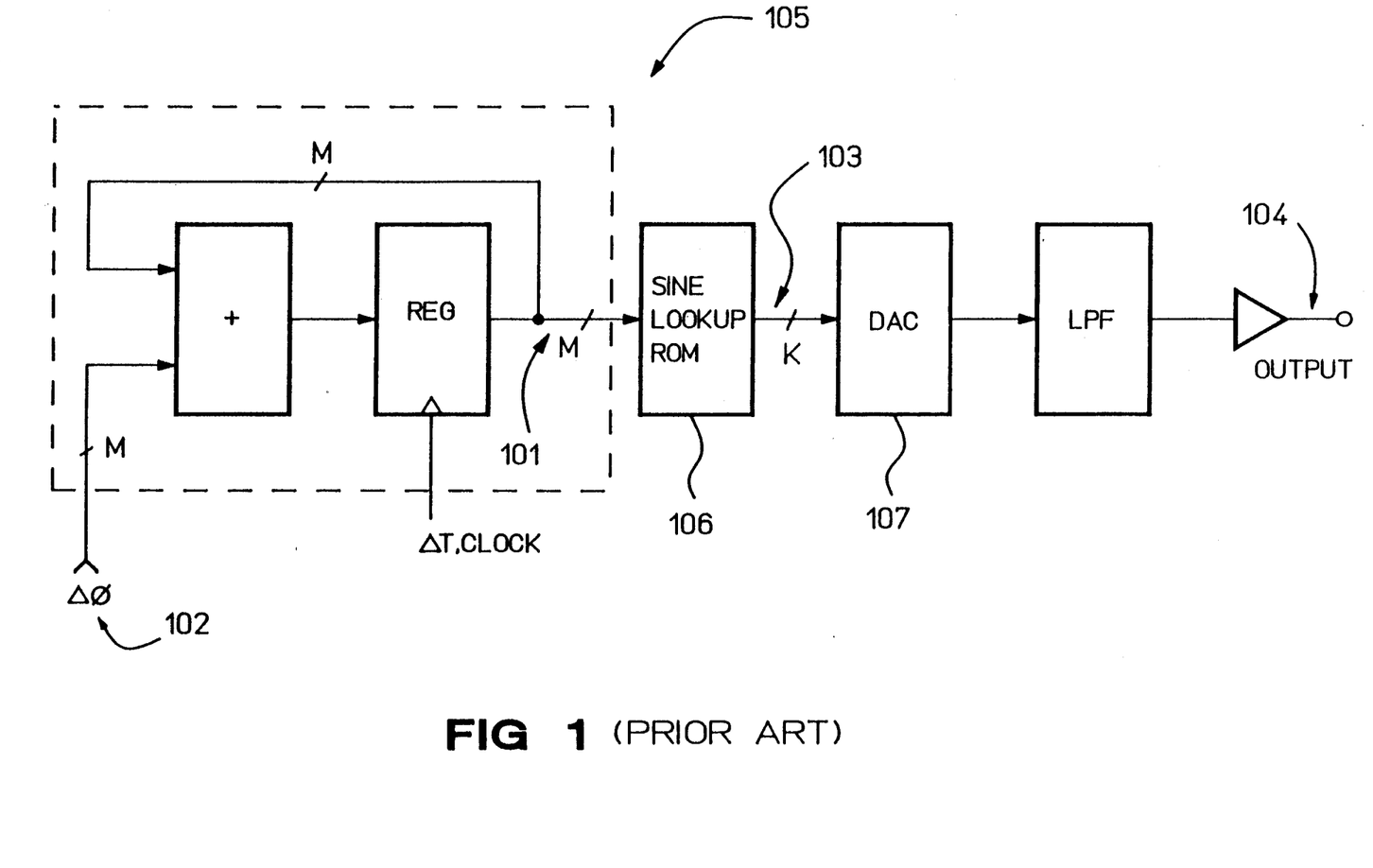
FIG. 1 illustrates a digital signal synthesizer of the prior art.

Direct digital synthesis is useful for avoiding the above problems associated with analog syntheses. Basically, digital synthesis consists of generating a stream of points with digital logic circuits to represent a desired signal. Then this numerical data stream is converted into the actual desired signal by means of a k-bit digital-to-analog converter (DAC). The DAC output can be further processed to provide a more useful signal. For example, it can pass through a low pass filter for a smoother and cleaner signal and an amplifier for compensating losses incurred through the conversion and filtering processes. The resulting analog output is, ideally, free of sampling components. An example of such a system for synthesizing signals in the prior art is described in U.S. Pat. No. 3,928,813. FIG. 1 shows a diagram of one such typical digital numerical synthesizer known in the prior art. In this system, the defining relationship for frequency is:

$$F = (\Delta\phi/\Delta T)/(2\pi),$$

where $\Delta\phi$ is the input phase increment for uniquely determining the frequency of the system output signal F and $\Delta T$ is the period of the system digital clock, or $1/F_{clock}$, where $F_{clock}$ is the frequency of the system clock. In this system, $2\pi$ is defined as $2^M$, where M is the number of bits in the field for $\Delta\phi$, which ranges from 0 to $2^M - 1$.

The basic system in FIG. 1 is easily modified to include phase modulation by adding in a phase modulation term, PM(T), at the phase accumulator output 101. Also, frequency modulation may be realized by adding in a carrier phase increment and a frequency modulation phase increment to form the instantaneous phase increment $\Delta\phi$ 102. For a truly universal synthesizer, amplitude modulation may also be added to the system. For this implementation, a fast multiplier may be added at the sine table output 103. Other similar implementations for modulating the system output signal are described in U.S. Pat. No. 4,331,941.

The system in FIG. 1 may also be used as a fast switching frequency source. Such a usage of this circuit is quite common, because the circuit output 104 can change from $F_1$ to $F_2$ just by changing the carrier phase increment 102 from $\Delta\phi_1$ to $\Delta\phi_2$. Because of the complex multiplication and mixing processes associated with each switched frequency that need to be implemented, building a comparably fast switching analog-based synthesizer, however, would be very difficult.

Figure 2:
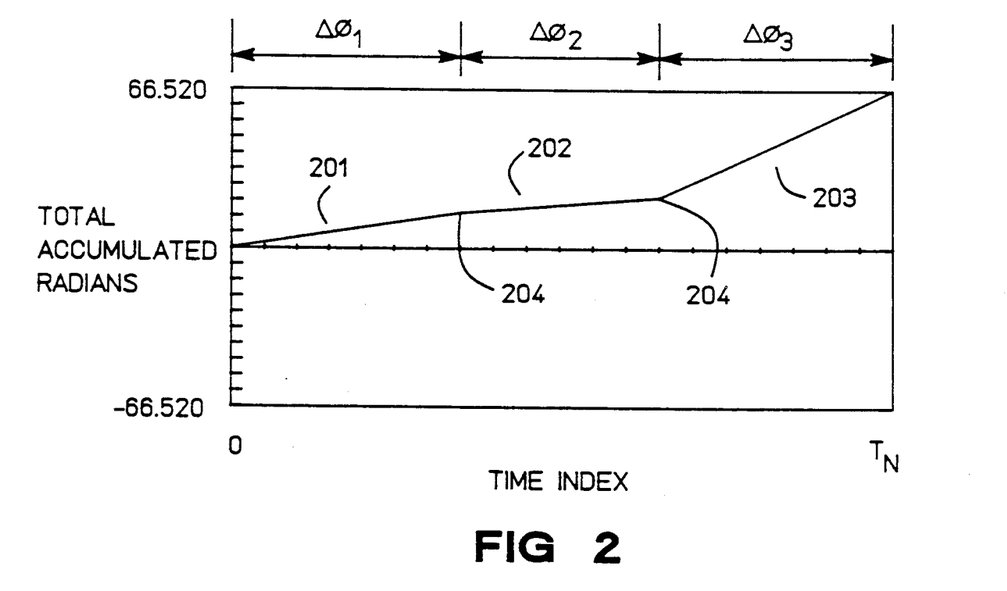
FIG. 2 shows the phase accumulator output having three different carrier phase increments.

A characteristic of the synthesizer of FIG. 1 is its phase continuity between adjacent output frequencies. In other words, the transition from a first frequency $F_1$ to a second frequency $F_2$ is accomplished without any abrupt carrier amplitude change. This lack of an abrupt change implies that no phase discontinuity occurs at the instant the system output signal switches from frequency $F_1$ to frequency $F_2$. To appreciate this phase continuous nature of the synthesizer output signal, one should consider the synthesizer represented by the phase ramps 201, 202, 203 in FIG. 2. The phase ramps 201, 202, 203 form an exemplary output of the phase accumulator 105 of FIG. 1 for three different carrier phase increments, $\Delta\phi$ 102: $\Delta\phi_1$, $\Delta\phi_2$ and $\Delta\phi_3$. These carrier phase increments correspond to three output frequencies $F_1$, $F_2$ and $F_3$, respectively. In FIG. 2, the phase at each frequency switch point 204 again changes without a discontinuity. In the time increment shown, $T_N$, a total phase of 66.52 radians has accumulated. This amount is equivalent to approximately 10.5 cycles of a sine wave.

Figure 3:
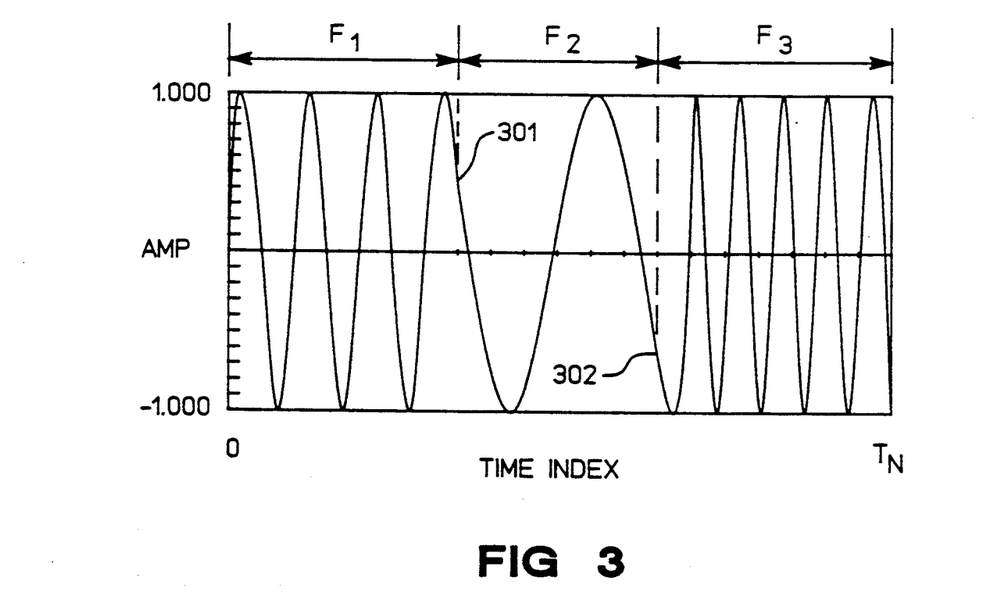
FIG. 3 shows the sine signal of the phase accumulator system in FIG. 1.

FIG. 3 shows the sine wave resulting from the signal represented by the phase accumulation in FIG. 2 passing through the sine-lookup ROM 106 and DAC 107 blocks of FIG. 1. The transition point for $F_1$ to $F_2$ 301 and the one for $F_2$ to $F_3$ 302, in keeping with the non-abrupt changes 204 in accumulated phase, are smooth and phase continuous.

Figure 4:
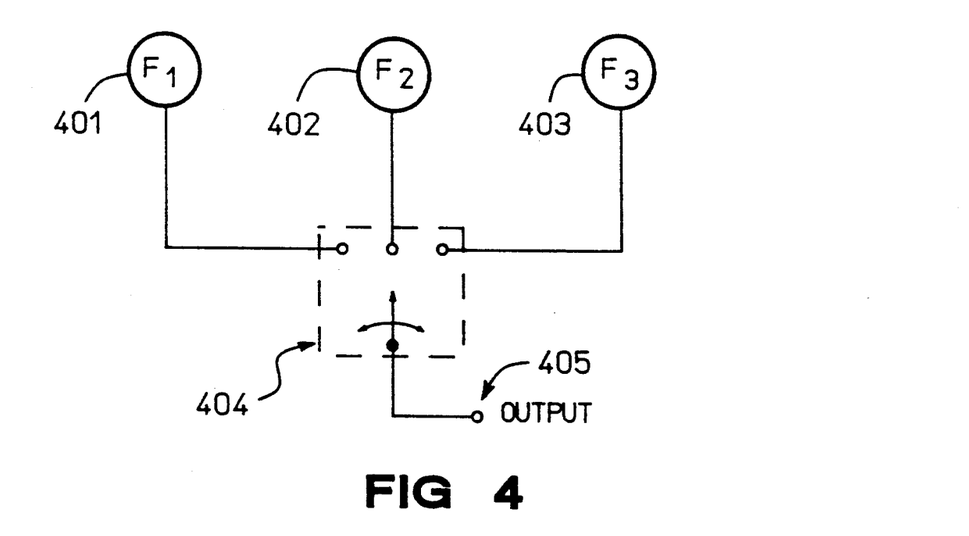
FIG. 4 illustrates a system multiplexing three oscillators to arrive at a synthesized output signal.
Figure 5A:
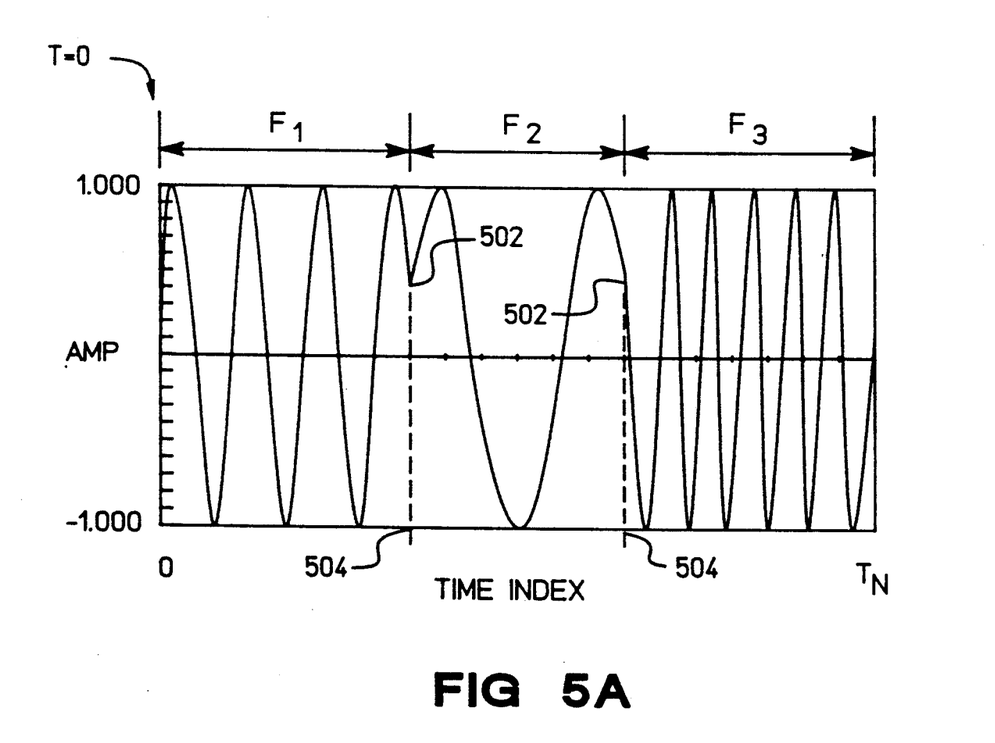
FIG. 5A shows the abrupt changes at the points of transition in the multiplexed system of FIG. 4.

The object of the present invention is not to preserve phase continuity but to allow frequency switching, or frequency hopping, with phase memory, among any number of frequencies $F_1$, $F_2$, $F_3$, . . . , $F_N$. In other words, with each frequency hop, the output signal assumes a new frequency at the same phase that the signal would have had if the signal had started with the new frequency at a common zero time, $T_0$, when all the frequencies start at zero phase. Thus, the output of the signal in accordance with the present invention is equivalent to a signal resulting from switching among a series of separate oscillators having frequencies $F_1$, $F_2$, . . . , $F_N$ respectively, all of which start at time $T_0$. FIG. 4 shows an example of such an equivalent analog system with phase memory. Three oscillators 401, 402, 403, which run continuously, are locked together to start simultaneously at $T_0$. A switch 404 is used to select which oscillator is to be the output signal 405. Since all three oscillators 401, 402, 403 never stop, whenever the switch 404 selects a different source, the phase will seemingly jump to account for the current phase of the selected source. This system always has as its output 405 a source with its correct phase at the instant of switching. This ability of a system to maintain and remember a constant phase for each switched frequency as though each has started at a common starting time and be able to switch into any new frequency at the appropriate point of the constant phase is termed "phase memory." FIG. 5A shows the output signal of the system in FIG. 4 as it switches among $F_1$, $F_2$ and $F_3$. The "glitch" 502 that occurs at the instant of switching 504 is characteristic of a frequency hopped source with phase memory.

Figure 5B:
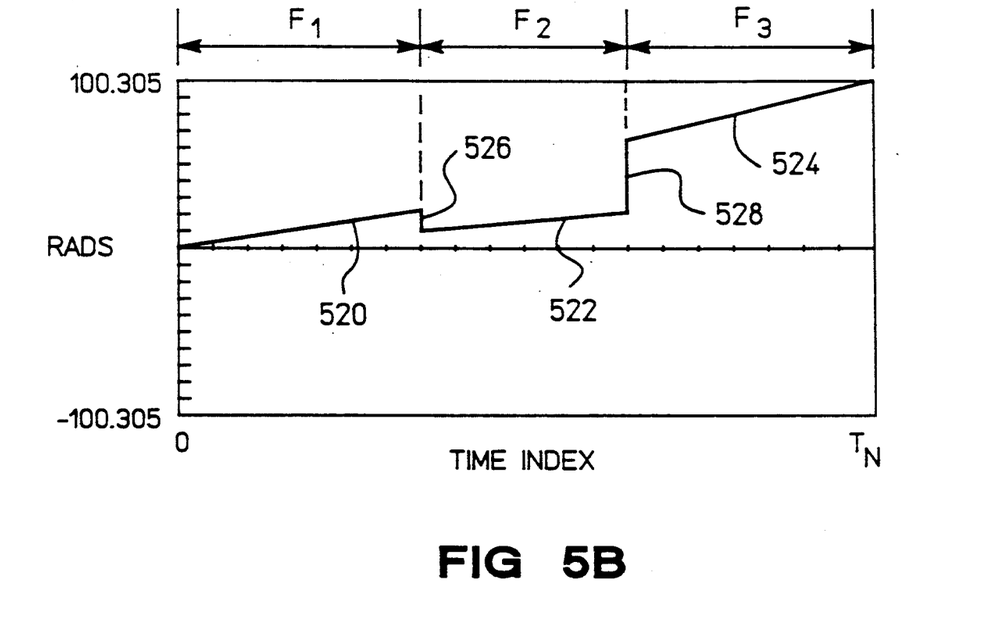
FIG. 5B shows the equivalent phases of the output signal in a system like the one in FIG. 5A.
Figure 5C:
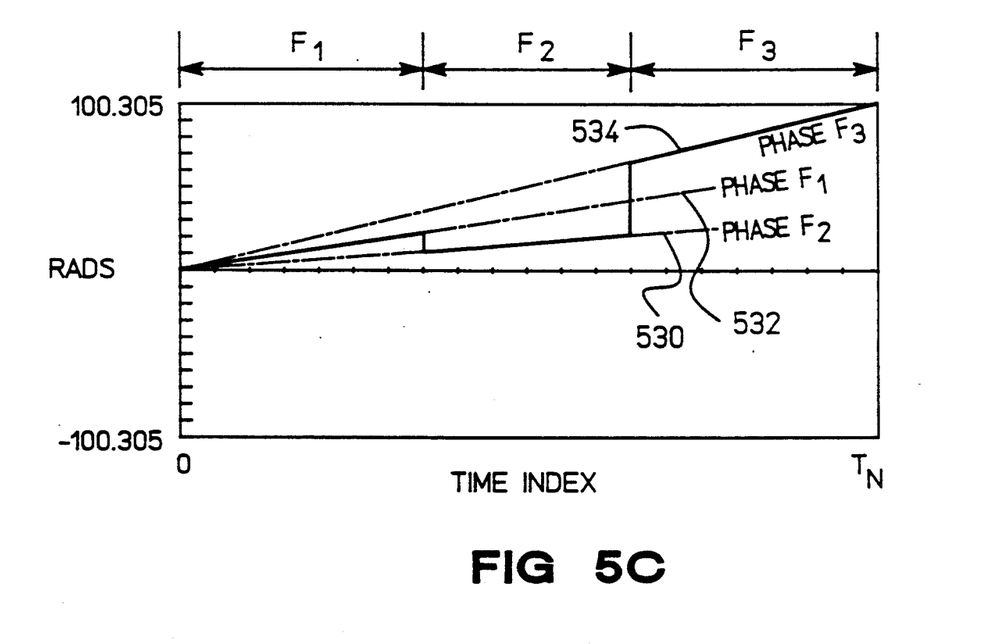
FIG. 5C illustrates the phases of three oscillators all starting at T=0.

FIG. 5B shows the phase term of the signal in FIG. 5A; it is analogous to the phase term in FIG. 2. The phase is composed of three different phase slopes 520, 522, 524. The first slope 520 starts at T=0 and corresponds to $F_1$. The other two slopes 522, 524 correspond to $F_2$ and $F_3$. In fact, all three started their rise at T=0, but only one oscillator is sampled for an actual output at any given time. FIG. 5C illustrates the phase of all three oscillators simultaneously. FIG. 5B also shows the phase offsets $P_{Cor1 \rightarrow 2}$ 526 and $P_{Cor2 \rightarrow 3}$ 528 that exist when a frequency hop occurs from $F_1$ to $F_2$ and from $F_2$ to $F_3$, respectively; they are the cause of the abrupt change 502, or "glitch," during its frequency transition 504.

The prior art system in FIG. 1 may be modeled as a single oscillator that may be changed to a new frequency only by changing the value of the input phase increment $\Delta\phi$ 102. The starting phase of the new frequency is just the ending phase of the one that preceded it. The present invention extends the system in FIG. 1 to appear that many oscillators are all running simultaneously and that only one is being sourced as the output at any given time. Since both phase memory and phase continuity are aspects of frequency hopping systems, one of the two is usually required and is determined by the exact application of the frequency hop.

SUMMARY OF THE INVENTION

To overcome the lack of a phase memory in prior art direct digital synthesizers, the present invention detects a frequency hop in response to a change in input phase increment and calculates a phase correction signal. In accordance with the present invention, the preferred embodiment uses a difference operator to determine the change, or difference, in the phase increment input. Then this difference value is combined, for example, through a multiplier with the output from a counter which accumulates a timing reference signal to produce the phase correction signal. The phase correction signal in turn is combined with the synthesized digital signal representing the desired output signal at a selected frequency, $F_s$. The resultant output signal at that selected frequency then maintains a constant phase relative to a reference system clock pulse for the duration of the synthesizer operation. Consequently, regardless of the number of intervening frequency hops the output signal may undergo and regardless of the frequencies it switches to during this intervening period, whenever the output signal switches to frequency $F_s$, the output signal at frequency $F_s$ has the same constant phase it has at that frequency as before. If the output signal switches to a newly selected frequency, the preferred embodiment of the present invention will provide the output signal with the same constant phase if the output signal were to switch to that frequency at a later time.

DETAILED DESCRIPTION OF THE INVENTION

The present invention enhances and extends the capability of the prior art synthesizer by including a phase memory in it. Specifically, the preferred embodiment of the invention has the following characteristics:

1. At time T=0, all "oscillators," that is, the non-existent virtual "oscillators" that provide the various frequencies for the system to switch to, are simultaneously "started." By definition, all of them start with an initial phase of zero radian.

2. With a phase accumulator of M-bits, there are $2^M/2$ frequencies that may be generated by a prior art synthesizer like the one featured in FIG. 1. The preferred embodiment of the present invention will maintain phase memory for each $2^M/2$ frequencies. Through simplification in design, however, it is possible to provide phase memory for fewer frequencies, if desired, with a concomitant saving in manufacturing costs.

3. The invention includes a circuit that calculates a phase correction value, $P_{Cor}$, which is permanently added to the carrier phase to enable a signal of a first frequency $F_1$ to hop or switch to a second frequency $F_2$ with the proper phase offset so that the signal looks as if it had never left the second frequency from its inception at T=0, thus resulting in phase memory.

4. Once the synthesizer in accordance with the preferred embodiment has started (at T=0), it never needs to be reset or resynchronized at any time to align the phases of each of the $2^M/2$ frequencies for phase memory. In other words, the system in accordance with the preferred embodiment of the invention will feature phase memory with no degradation of performance for an indefinite number of frequency hops.

These characteristics will become more evident as the mathematical basis of the present invention is discussed.

If N is the number of clock pulses having a period $\Delta T$ that have elapsed, the phase at time $N \cdot \Delta T$ of a carrier of frequency $F_i$ is:

$$\text{Phase of } F_i = 2\pi \cdot F_i \cdot N \cdot \Delta T \, \text{Modulo}(2\pi)$$
$$= \omega_i \cdot N \cdot \Delta T \, \text{Modulo}(2\pi).$$

Also, the phase of $F_j$ at time $N \cdot \Delta T$ is:

$$\text{Phase of } F_j = \omega_j \cdot N \cdot \Delta T \, \text{Modulo}(2\pi).$$

Any of the possible $2^M/2$ frequencies to which an M-bit digital synthesizer may be switching may be represented this way.

If $F_j$ is the frequency of the current output signal of the synthesizer and $F_i$ is the new frequency the output signal is being switched to, then the phase correction $P_{Cor}$ needed for phase memory at time $N \cdot \Delta T$ is:

$$P_{Cor} = [\omega_i \cdot N \cdot \Delta T - \omega_j \cdot N \cdot \Delta T] \text{ Modulo}(2\pi)$$
$$= (\omega_i - \omega_j) N \cdot \Delta T \text{ Modulo}(2\pi).$$

This last equation is interpreted as the difference between two phase ramps. It is this difference term in $P_{Cor}$ that must be permanently added to the carrier phase of the synthesizer for phase memory in accordance with the invention to take place.

The expression and hence the implementation of phase correction $P_{Cor}$ may be simplified. From FIG. 1, one sees that:

$$F_i = (\Delta \phi_i / \Delta T)/(2\pi).$$

Then:

$$2\pi F_i = \omega_i = \Delta \phi_i / \Delta T,$$

and $$P_{Cor} = (\Delta \phi_i \cdot N - \Delta \phi_j \cdot N) \text{Modulo}(2\pi) = (\Delta \phi_i - \Delta \phi_j) \cdot N \text{ Modulo}(2\pi).$$

In other words, the phase correction is the difference in accumulated phase increments with modulo $2\pi$ at the Nth clock pulse. Also, as shown in the system of FIG. 1, $2\pi = 2^M$. Therefore, the above equation for $P_{Cor}$ can also be expressed as follows:

$$P_{Cor} = (\Delta \phi_i - \Delta \phi_j) \cdot N \text{ Modulo}(2^M).$$

By extension, the phase correction $P_{Cor}$ needed when switching to a new frequency $F_k$ from an existing frequency $F_j$ is:

$$P_{Cor} = (\Delta \phi_k - \Delta \phi_j) \cdot N \text{ Modulo}(2^M).$$

Thus, the phase correction $P_{Cor}$ is easily calculated so long as the current phase increment $\Delta \phi_j$ and the next phase increment $\Delta \phi_k$ are known. The phase correction is calculated at the instant the current phase increment changes to the next one. Also, the phase correction must, by some means, be stored currently and used subsequently to offset the carrier phase permanently.

Figure 6A:
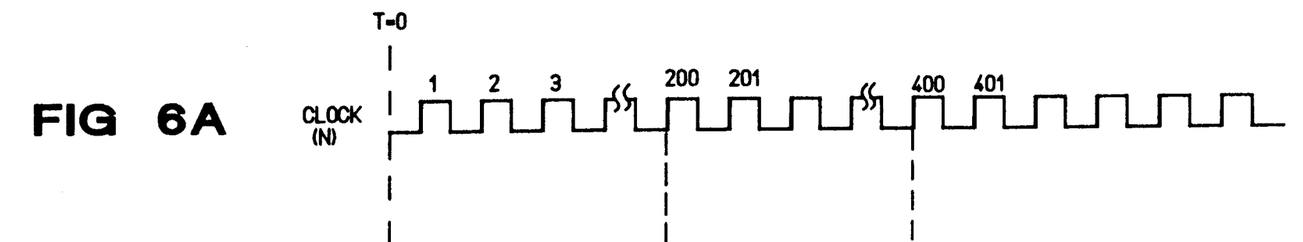
FIGS. 6A-6D are timing diagrams of the phase corrections relative to a frequency hop for phase memory.
Figure 6B:
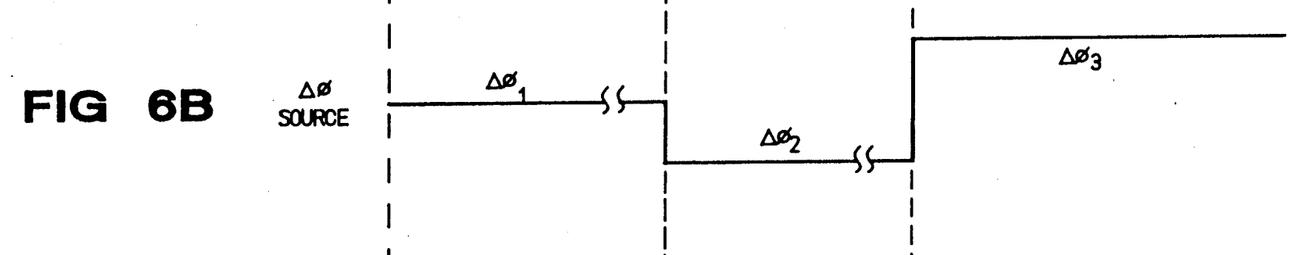
Figure 6C:
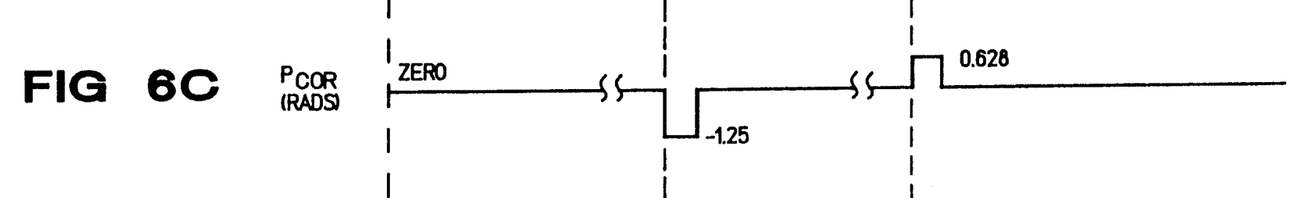
Figure 6D:
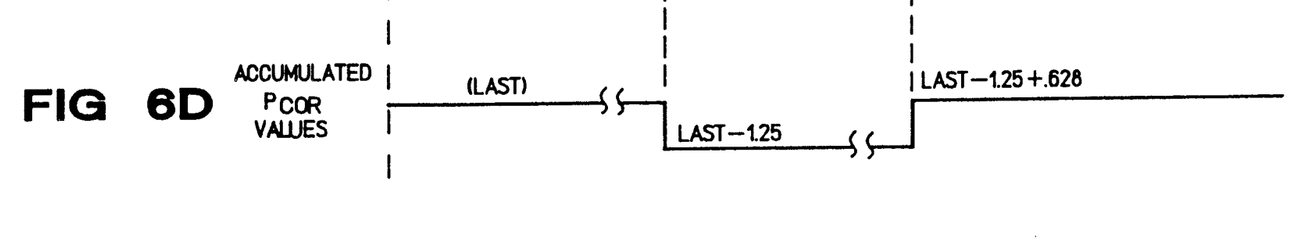

FIGS. 6A through 6D show the timing sequence of a signal having three frequency hops. FIG. 6A shows the clock pulses of a system clock having a frequency $F_{clock}$. FIG. 6B shows three differing input phase increments $\Delta \phi_1$, $\Delta \phi_2$ and $\Delta \phi_3$. FIG. 6C shows the corresponding phase corrections at the instant of the frequency hops. And FIG. 6D shows the phase corrections being accumulated to provide phase memory to the output signal of the system. The values of $\Delta \phi$ correspond to those required for the synthesizer in FIG. 5A. Thus,

| | |
|---|---|
| $\Delta \phi_1 = 3.4(2\pi)/200$ | (1.7% of $F_{clock}$) |
| $\Delta \phi_2 = 1.2(2\pi)/200$ | (0.6% of $F_{clock}$) |
| $\Delta \phi_3 = 5.75(2\pi)/200$ | (2.9% of $F_{clock}$) |

The phase correction is easily calculated at the instance of a frequency hop. If each of the three phase increments is of a duration of, for example, 200 clock pulses, then $N = 200$ at the transition from $\Delta \phi_1$ to $\Delta \phi_2$ and $N = 400$ at the transition from $\Delta \phi_2$ to $\Delta \phi_3$. Thus, the phase correction for the first transition is:

$$P_{Cor(1 \to 2)} = (1/200)(2\pi)(1.2 - 3.4)200 \text{ Modulo}(2\pi)$$
$$= (0.2)(2\pi)$$
$$= -1.25 \text{ radians or } -72°.$$

This amount is the phase jump from $F_1$ to $F_2$ that the signal takes in FIG. 5A. Similarly, the phase correction for the transition from $F_2$ to $F_3$ is:

$$P_{Cor(2 \to 3)} = 0.628 \text{ radians}.$$

Since every phase correction value must be permanently added to the carrier phase, these values must be stored in a $P_{Cor}$ phase accumulator. This $P_{Cor}$ phase accumulator contains the composite sum of every previously computed phase correction value and acts as a memory for the phase corrections. FIG. 6D illustrates the accumulated sum of all previous phase corrections for the frequency hops of the output signal in FIG. 5A. This sum must be used to offset the carrier phase. In effect, every new phase correction value must be added to the past sum of every other phase correction value.

Figure 7:
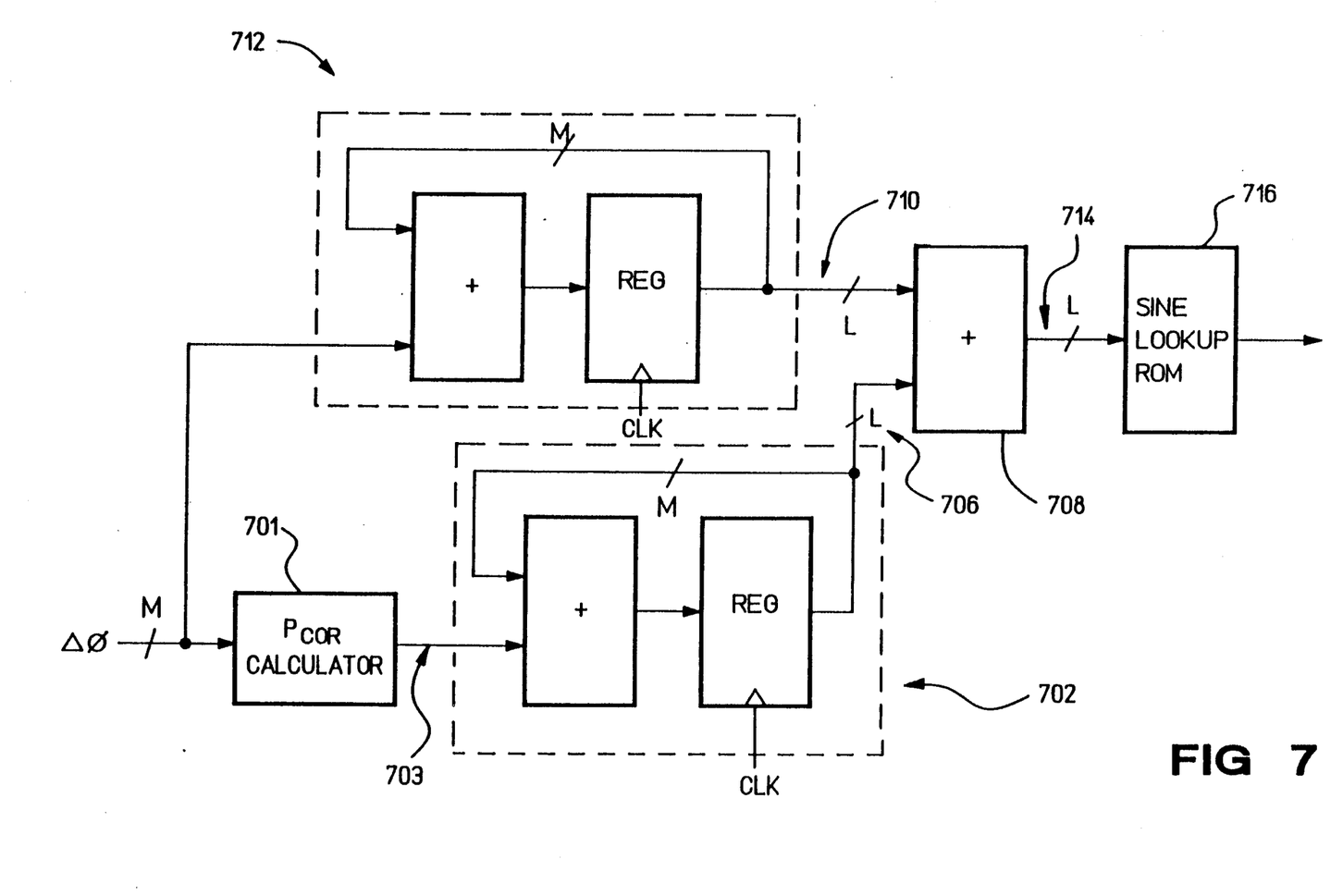
FIGS. 7-8 illustrate examples of a system with phase memory in accordance with the invention.
Figure 8:
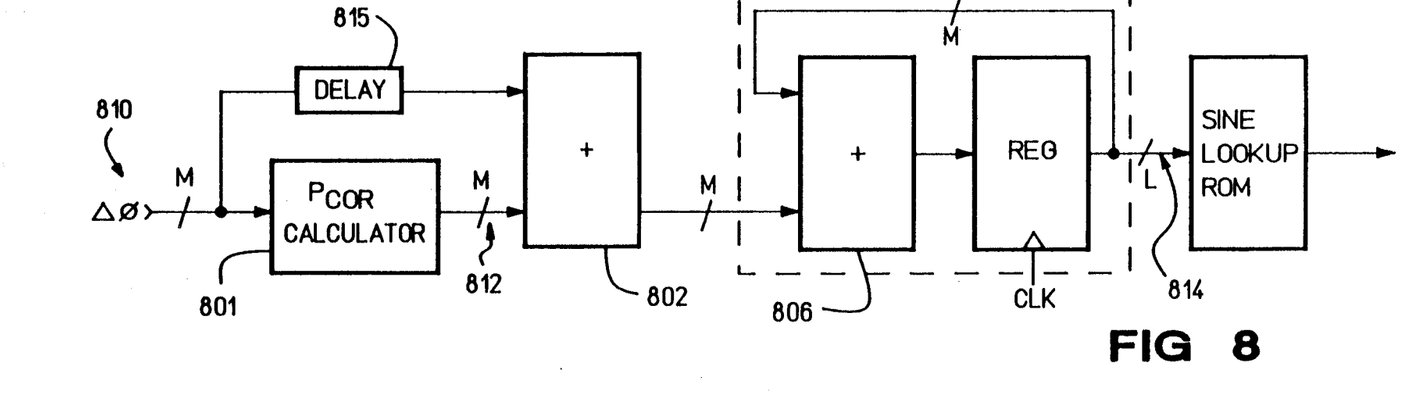

Phase corrections in accordance with one embodiment of the invention lasts only for a clock pulse and occurs immediately after a frequency hop. This fact is illustrated by the timing diagram of FIG. 6C. The placement of a phase correction calculator 701 is shown in the example system of FIG. 7. In this system, a phase correction phase accumulator 702 for retaining the phase corrections 703 and maintaining an accumulated sum of them 706 is also shown. A phase offset adder 708 adds the accumulated sum of phase corrections 706 to the accumulated carrier phase 710 produced by a carrier phase accumulator 712. An alternate preferred embodiment of the invention is illustrated in FIG. 8. This embodiment, though achieving identical results as the system in FIG. 7, does not require a phase accumulator for phase corrections 702. Instead, with each change of the carrier phase increment 810, the resultant phase correction $P_{Cor}$ 812 is added to the phase increment $\Delta \phi$ 810 for one clock period by a phase correction adder 802. This nonzero value of $P_{Cor}$ 812 lasts only one clock cycle and is added into the carrier phase accumulator 804 by the input adder 806 of the carrier phase accumulator 804. In effect, the phase correction offset is permanently added to the carrier phase. To account for a possible delay of the $P_{Cor}$ signal 812 from the input phase increment 810 $\Delta \phi$ as the $P_{Cor}$ signal 812 propagates from the $P_{Cor}$ calculator 801, a delay block 815 serves to delay the phase increment $\Delta \phi$ 810 before it enters the $P_{Cor}$ adder 802. This delay ensures that when a new input phase increment $\Delta \phi$ 810 is present, the $P_{Cor}$ output signal 812 produced by the $P_{Cor}$ calculator 801 in response to the new phase increment $\Delta \phi$ 810 will be coincident with the new input phase increment $\Delta \phi$ 810 at the input ports of the $P_{Cor}$ adder 802.

As shown above, the expression for a phase correction offset is as follows:

$$P_{Cor} = (\Delta \phi_{next} - \Delta \phi_{last}) \cdot N \text{ Modulo}(2^M).$$

Figure 9A:
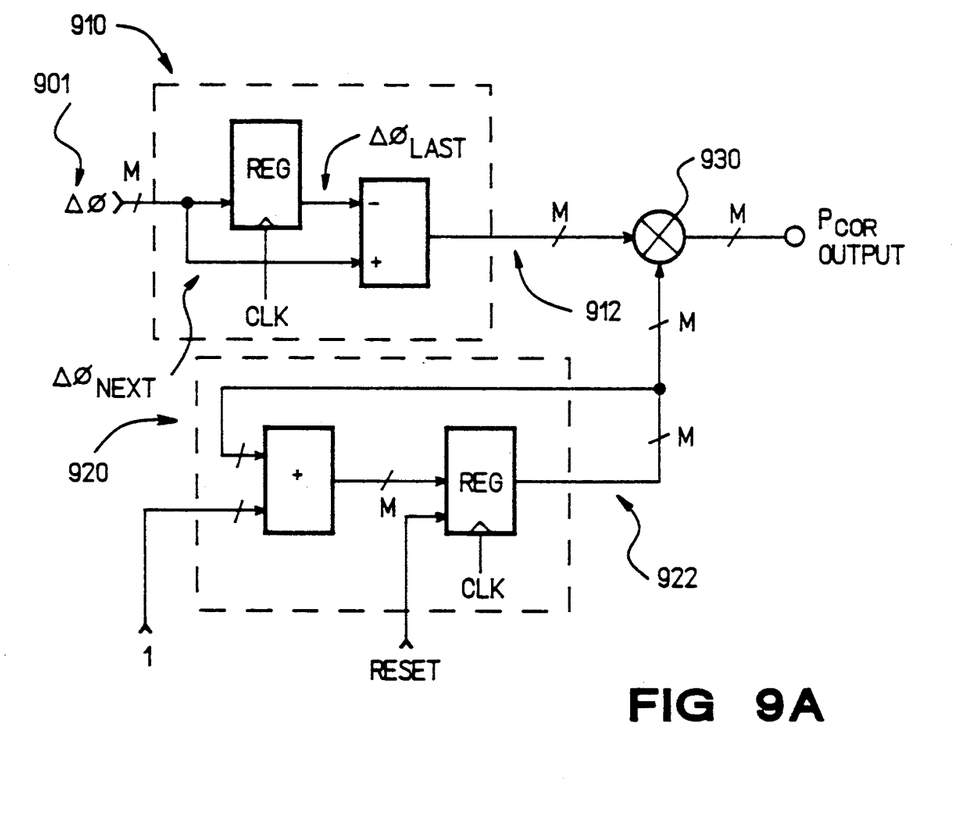
FIG. 9A illustrates the preferred embodiment of a phase correction scheme to achieve phase memory in a digital synthesizer system in accordance with the invention.
Figure 9B:
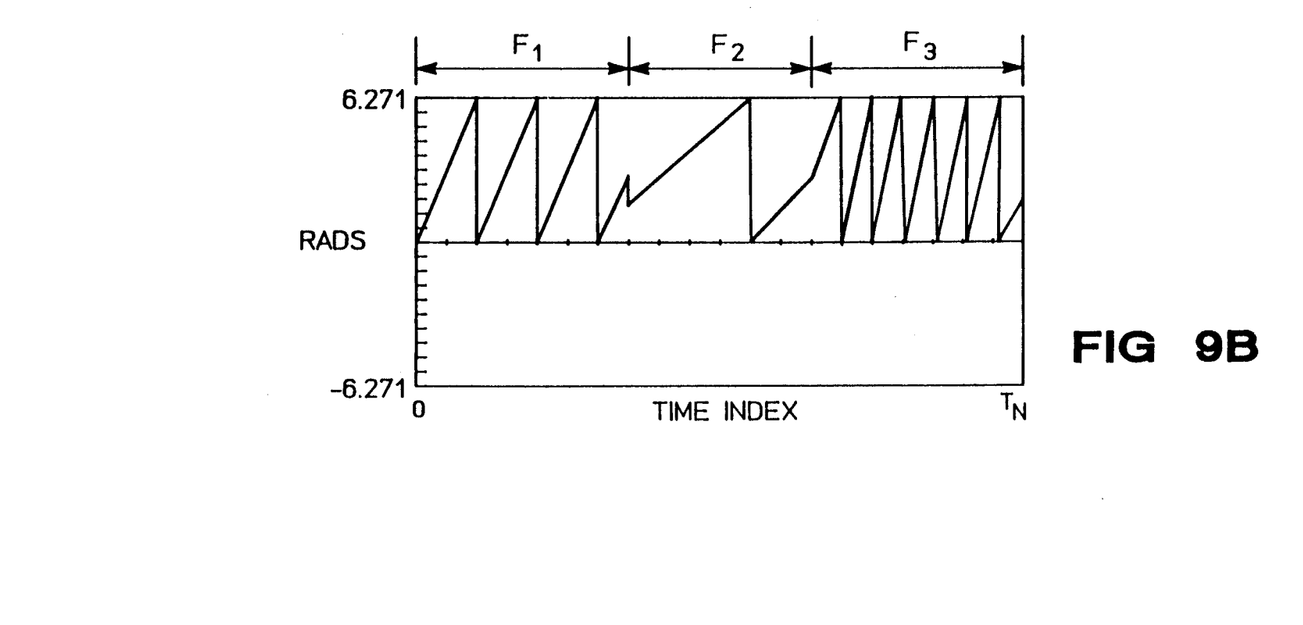
FIG. 9B contains a diagram of the carrier phases in a system with phase memory switching among frequencies $F_1$, $F_2$ and $F_3$.

This expression is implemented by the circuit illustrated in FIG. 9A. FIG. 9A has three main blocks: a difference operator 910, a counter 920 for accumulating the number N of clock cycles that have elapsed as a timing reference, and a multiplier 930. The difference operator 910 computes to M-bits the difference in phase increments 912 during a frequency hop, $(\Delta\phi_{next} - \Delta\phi_{last})$. This value is zero except during the one clock period following a change in the phase increment 901. This value can range from 0 to $2^M - 1$. The N counter 920 is the timing reference. It is reset to zero at T=0 by external means (not shown). Its output 922 ramps from 0 to $2^M - 1$ and then repeats, because of its modulo $2^M$ operation. The preferred embodiment of the invention places no restriction on the size of N. However, the N counter 920 is designed as a modulo device with a modulo of ($2^M$) to take advantage of the implementation of a modulo phase correction calculator, since a phase correction $P_{Cor}$ can also be expressed as follows:

$$P_{Cor} = A \cdot B \; \text{Modulo}(2^M)$$
$$= [A \; \text{Modulo}(2^M)] \cdot [B \; \text{Modulo}(2^M)] \; \text{Modulo}(2^M).$$

This relationship follows from the decomposition theorem in number theory. Carrying this relationship farther, the phase correction $P_{Cor}$ can also be expressed as:

$$P_{Cor} = [(\Delta\phi_{next} - \Delta\phi_{last}) \; \text{Modulo}(2^M)] \cdot [N \; \text{Modulo}(2^M)] \text{Modulo}(2^M).$$

This form of the phase correction allows the multiplier 930 in FIG. 9A to have an output of modulo($2^M$) also. Thus, all three blocks 910, 920, 930 in FIG. 9A function in a modulo($2^M$) mode. In practical terms, the output of any of the blocks 910, 920, 930 in FIG. 9A uses only the lowest M-bits. Modulo math arises because when dealing with carrier phase, only values in the range of 0 to $2\pi$, that is, 0 to $2^M$, are important.

As an example, suppose the preferred embodiment of the invention as depicted in FIGS. 8 and 9A has the following values:

M bits = 30 bits
L significant bits = 12 bits
System clock frequency $F_{clock}$ = 134.217 MHz
System output signal frequency $F_{out}$ range = 0 to 67.1 MHz
Output signal frequency $f_{out}$ step resolution = $(\frac{1}{2}^{30})(134.217)$ MHz
= 0.125 Hz
Phase correction $P_{Cor}$ resolution = $(2\pi)/(2^{30})$ radians
= 5.85 E-9 radians The carrier phase accumulator output 814 is then truncated to L=12 bits. The actual phase accuracy obtained when a frequency hop occurs therefore is $(2\pi)/(2^{12}) = (2\pi)/4096$, or 0.00153 radians. The phase correction components of FIG. 9A, however, is preferably comprised of 32-bit logic/arithmetic elements. As noted previously, the frequency resolution for this example is 0.125 Hz. If the desired frequency resolution could be larger, then the phase memory circuitry may have a concomitant reduction in bit width.

As described thus far, the preferred embodiment of the invention can accept every pulse of a clock and calculate a phase correction $P_{Cor}$ for the sum of the pulses accumulated up to the current pulse. If the phase correction calculator logic block is pipelined with clocked registers as shown in FIG. 9A, the frequency hop rate could be as high as 100 MHz with a proper circuit design. For most applications, however, a frequency hop rate as high as 100 MHz is definitely not needed. In fact, in most current practical systems, the hop dwell time is generally greater than 250 nanoseconds.

Figure 10:
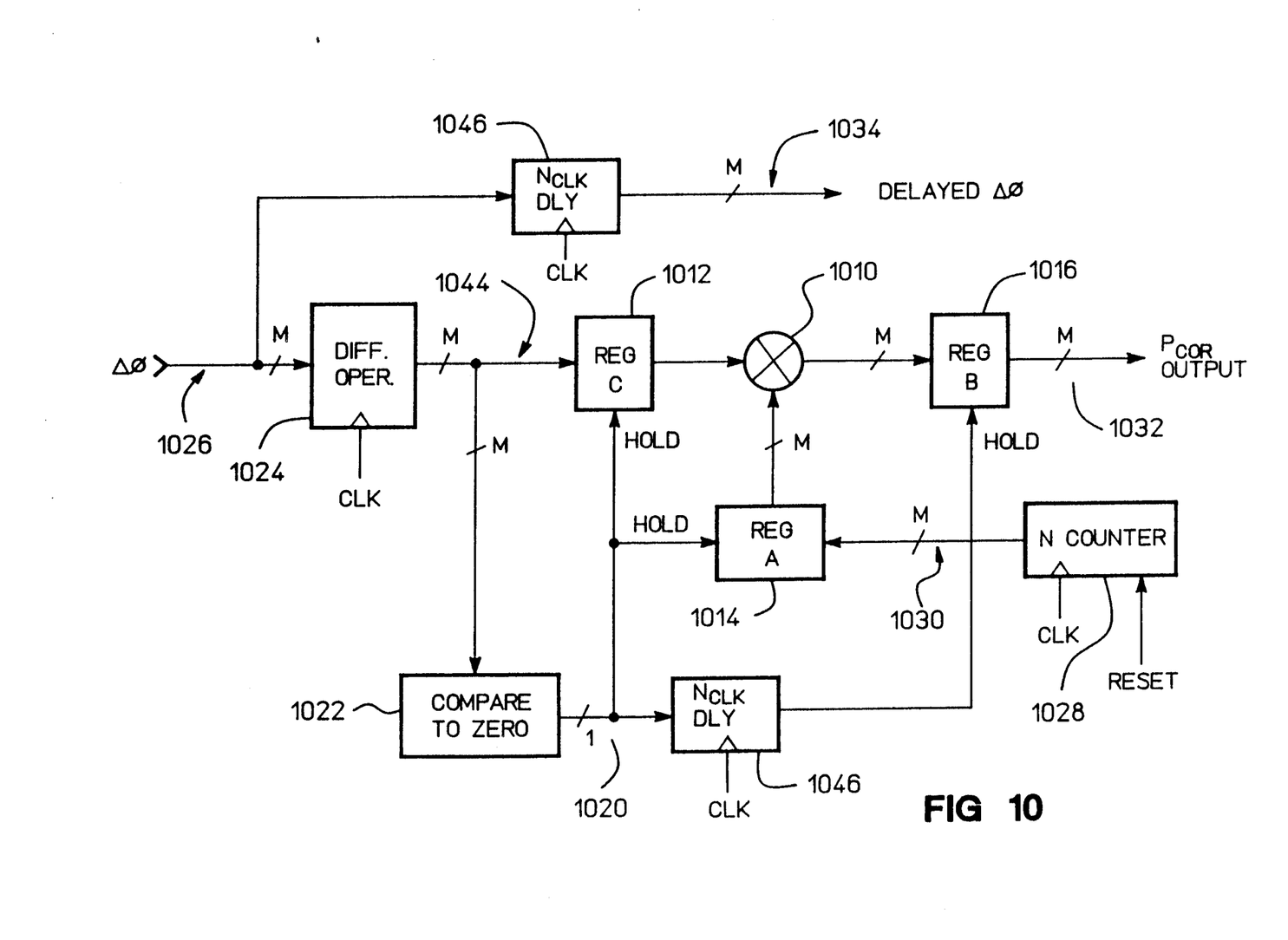
FIG. 10 shows a preferred embodiment of the invention to allow the use of slower multipliers.

In systems that only need to hop (or switch frequency) every $N_{clock}$ cycles, it is possible to simplify the phase correction logic. With this simplification, less expensive, and hence more accessible, multipliers can be used. FIG. 10 illustrates this simplification. If the phase increment $\Delta\phi$ is constrained to changes no faster than $N_{clk}$ cycles of the clock, then the multiplier 1010 has $N_{clock}$ cycles to do the multiplication. The multiplier 1010 is isolated through holding registers 1012, 1014, 1016 from any inputs changing. A hold command 1020 is generated by a phase increment change detector 1022, which detects a nonzero output from a difference operator 1024. The difference operator 1024 detects a change in the input phase increment; a nonzero output from it 1024 starts the multiply cycle. Timing for this simplified circuit is straightforward. Whenever the phase increment $\Delta\phi$ 1026 changes, the value 1030 in an N counter 1028 for accumulating a time count by counting the system clock pulses is held in a first register (Register A) 1014 and the difference in phase increments from the last one to the next one, that is, $\Delta\phi_{next} - \Delta\phi_{last}$, is held in another register (Register C) 1012. Since a correction signal is not needed until the input phase increment changes again, for example, after $N_{clock}$ cycles, the multiplier 1010 has $N_{clock}$ cycles to produce a stable output. The hold-delay signal 1020 causes a third register (Register B) 1016 to hold the output 1032 of the multiplier 1010 until the multiplication is complete for the phase correction signal, $P_{Cor}$ 1032. It should be noted that since the phase correction 1032 is delayed, the incoming phase increment $\Delta\phi$ 1026 must also be delayed so that both the new phase increment 1034 and phase correction 1032 are always coincident at the phase correction block output. A delay circuit 1046 is added to the circuitry for this purpose. In sum, in the simplified embodiment of the invention, all logic circuits other than the multiplier operate at the system clock rate $F_{clock}$.

We claim:

1. A direct digital synthesizer having a system clock providing clock pulses and an output signal shiftable to a plurality of frequencies comprising:

a signal generating means responding to a correction signal for generating said output signal,; and a phase memory means coupled to said signal generating means for generating said correction signal in response to a phase increment input signal, wherein said phase increment input signal determines one of said plurality of frequencies for said output signal, wherein said output signal maintains a constant phase relative to pulse, applied to said phase memory means, for each of said plurality of frequencies and wherein said signal generating means and phase memory means are controlled by said system clock.

2. The direct digital synthesizer of claim 1, wherein said phase memory means comprises a phase correction calculator.

3. The direct digital synthesizer of claim 2, wherein said phase correction calculator comprises:

a difference operator for determining an increment difference in said phase increment input;

a counter for accumulating a time reference count; and a combining means coupled to said difference operator and said counter for combining said increment difference and said accumulated time reference count to produce said phase correction signal.

4. The direct digital synthesizer of claim 3, wherein said combining means comprises a multiplier.

5. The direct digital synthesizer of claim 3, wherein said phase correction calculator further comprises:

a first register coupled between said combining means and said difference operator for holding said increment difference for a holding period;

a second register coupled between said combining means and said counter for holding said accumulated time reference count for said holding period; and one or more delay means coupled within said synthesizer for delaying said phase increment input and said phase correction signal for a substantially simultaneous output of both.

6. The direct digital synthesizer of claim 1, wherein said signal generating means comprises:

a carrier phase accumulator, an intermediate signal from said carrier phase accumulator; and an adder means for coupling said carrier phase accumulator and said phase memory means and for combining said intermediate signal with said correction signal to produce an offset phase signal; and wherein said direct digital synthesizer further comprises a sine means coupled to said adder means for responding to said offset phase signal to produce said generated output signal.

7. The direct digital synthesizer of claim 1, wherein said phase memory means comprises:

a phase correction calculator for generating an intermediate signal; and an adder which receives said intermediate signal for producing said phase correction signal for each system clock pulse; and wherein said phase memory means is coupled to said signal generating means by said adder.

8. A method for digitally synthesizing an output signal shiftable to a plurality of frequencies comprising the steps of:

generating an output signal of a kth frequency, having a first constant phase relative to a pulse, in response to an ith phase increment input, where kth and ith represent any one of said plurality of frequencies and phase increment inputs, respectively;

shifting said output signal to a next kth frequency in response to a next ith phase increment input, where said next kth frequency and next ith increment input are different from said kth frequency and said ith phase increment input; and phase correcting said output signal in response to said next ith phase increment input such that said output signal has a second constant phase relative to said pulse irrespective of said kth frequency and said ith phase increment input.

9. A method for digitally synthesizing an output signal shiftable to a plurality of frequencies comprising the steps of:

generating an output signal of a first frequency and of a constant first phase relative to a pulse in response to a first phase increment input signal;

shifting said output signal to a second frequency in response to a second phase increment input signal; and phase correcting said output signal in response to said second phase increment input signal such that said output signal shifts to said second frequency and maintains a constant second phase relative to said pulse.

10. The method for digitally synthesizing an output signal as in claim 9 further comprising the steps of:

shifting said output signal back to said first frequency in response to a return to said first phase increment input signal; and phase correcting said output signal in response to said first increment input signal such that said output signal returns to said first frequency and said constant first phase relative to said system reference clock pulse.

11. The method for digitally synthesizing an output signal as in claim 9, wherein the step of phase correcting comprises the steps of:

calculating a phase increment difference between said first and second phase increment input signals;

accumulating a time reference count from said first phase increment input signal to second phase increment input signal; and producing, in response to said phase increment difference and said time reference count, a phase correction signal for correcting said output signal at said second frequency.

12. The method for digitally synthesizing an output signal as in claim 10, wherein said step of phase correcting comprises the steps of:

calculating a phase increment difference between said second and first phase increment input signals;

accumulating a time reference count from said second phase increment input signal to said returned first phase increment input signal; and producing a phase correction signal for correcting said output signal at said returned first frequency.

13. The method for digitally synthesizing an output signal as in claim 8, wherein said step of phase correcting comprises the steps of:

calculating the difference between said ith and said next ith phase increment inputs;

accumulating a time reference count between said ith and said next ith phase increment inputs; and producing a phase correction signal for correcting said output signal at said next kth frequency.

* * * * *